Feb. 17, 1925.  
E. KIBLER  
1,526,914  
LOCK NUT  
Filed April 26, 1924
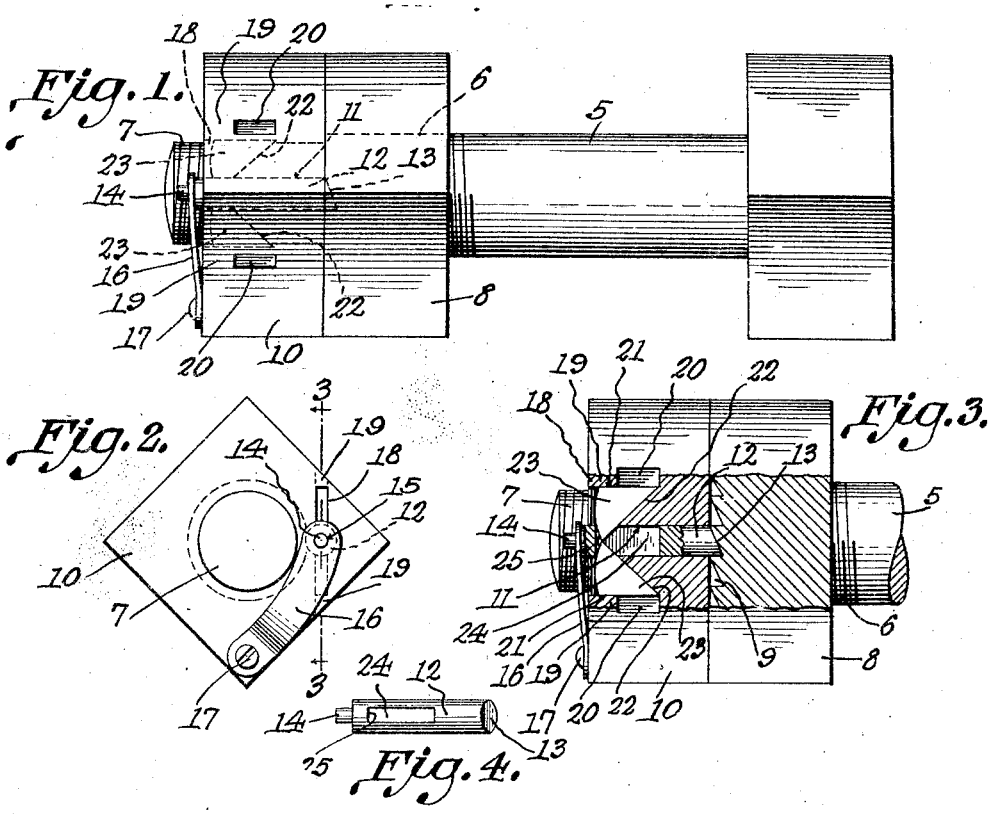
Inventor  
*Edward Kibler*  
By *Jerry A. Mathews*  
Attorney Patented Feb. 17, 1925.

1,526,914

UNITED STATES PATENT OFFICE.

EDWARD KIBLER, OF MARISSA, ILLINOIS, ASSIGNOR OF ONE-THIRD TO CARRIE TUCCI, OF ST. LOUIS, MISSOURI.

LOCK NUT.

Application filed April 26, 1924. Serial No. 709,214.

*To all whom it may concern:*

Be it known that I, EDWARD KIBLER, a citizen of the United States, residing at Marissa, in the county of St. Clair and State of Illinois, have invented certain new and useful Improvements in Lock Nuts, of which the following is a specification.

My invention relates to improvements in lock nuts.

An important object of the invention is to provide means to securely hold the lock and nut against accidental or improper turning movement, such means being so constructed that they may be readily operated to release the nut, when it is desired to unscrew the same, and will not become inoperative for this purpose, by the action of rain, snow or the like.

A further object of the invention is to provide a device of the above mentioned character, which is simple in construction, strong and durable.

Other objects and advantages of the invention will be apparent during the course of the following description.

In the accompanying drawings forming a part of this specification, and in which like numerals are employed to designate like parts throughout the same, Figure 1 is a side elevation of a device embodying my invention, Figure 2 is an end elevation of the same, Figure 3 is a detail section taken on line 3—3 of Figure 2, Figure 4 is a side elevation of the pawl included in the device.

Attention being called first to Figures 1 to 4 inclusive, the numeral 5 designates a bolt, having a forward screw threaded portion 6, carrying an extension 7, which is screw threaded, and of a reduced diameter. The portion 6 has its screw threads extending in a direction opposite to that of the screw threads of the portion 7. The screw threaded portion 6 carries an inner nut 8, having screw threaded engagement therewith, and this nut is provided upon its forward face with ratchet teeth 9. Arranged in advance of the nut 8 is a companion nut 10, screw threaded upon the reduced portion or extension 7, as shown.

The outer nut 10 is provided near one corner with a longitudinal opening 11, shown as cylindrical, for receiving a reciprocatory pawl 12, which may be cylindrical, and this pawl has its inclined or beveled end 13, positioned to engage the teeth 9. The outer end of the pawl 12 carries a reduced extension or pin 14, passing through an opening 15, in a leaf spring 16. This leaf spring is attached to the outer nut 10 by a screw 17 or the like. As stated, the pawl 12 is arranged at one corner of the nut, and a diagonal slot 18 is formed in the nut, at this corner, and leads into the outer end of the cylindrical opening 11. The slot does not pass through the side walls of the nut, but terminates short of the same, leaving webs 19. Upon the face of the nut, are formed openings 20, for the reception of a tool. These openings lead into tapered recesses 21, having inclined bottom walls 22.

Mounted to slide within these recesses 21 in engagement with the inclined walls 22, are segments or wedges 23, the ends of which project into a slot 24, formed in the pawl 12. The ends of the wedges engage beneath the shoulder 25, and these ends are arranged to clear each other, when either edge is moved inwardly.

From the foregoing description, it will be seen that the spring 16 will retain the pawl in engagement with the teeth 9, holding the nut 10 against unscrewing movement. When it is desired to unscrew the nut 10, either wedge 23 may be forced inwardly, and its inner end will clear the inner end of the other wedge and engaging the shoulder 25, will elevate the pawl out of engagement with the ratchet teeth 9.

Having thus described my invention, I claim:

1. The combination with a bolt having a screw threaded portion, of a nut carried by the bolt and provided near one corner with a longitudinal opening, said nut also having recesses leading into the opening which have inclined walls, a pawl mounted to slide within the opening and having a longitudinal slot formed therein, wedges within the recesses engaging the inclined walls and projecting into the slot of the pawl, yielding means to move the pawl inwardly, and a member having teeth to engage with the pawl.

2. The combination with a bolt having a screw threaded portion and a reduced screw threaded extension, of an inner nut mounted upon the screw threaded portion and having ratchet teeth upon its outer face, an outer nut mounted upon the reduced extension and provided at one corner with a longitudinal opening, said outer nut having recesses leading into the opening and having inclined walls, a pawl slidable within the opening to engage with the ratchet teeth and having a longitudinal slot and having an extension at its outer end, wedges slidable within the recesses in contact with the inclined walls and projecting into the slot, the ends of the wedges being arranged to clear each other, and a leaf spring attached to the outer nut and having an opening for receiving the extension of the pawl.

In testimony whereof I affix my signature.

EDWARD KIBLER.